United States Patent [19]

Madsen et al.

[11] Patent Number: 4,789,997

[45] Date of Patent: Dec. 6, 1988

[54] CIRCUIT ARRANGEMENT FOR PRODUCING HIGH VOLTAGES

[75] Inventors: Jens U. Madsen, Lyngby; Peer K. Hansen, Hvidovre, both of Denmark

[73] Assignee: Andrex Radiation Products AS, Denmark

[21] Appl. No.: 68,323

[22] Filed: Jul. 1, 1987

[30] Foreign Application Priority Data

Jul. 15, 1986 [DK] Denmark .............................. 3364/86

[51] Int. Cl.$^4$ .......................... H05G 1/34; H05G 1/50; H02M 7/00

[52] U.S. Cl. ..................................... 378/109; 378/110; 363/59

[58] Field of Search ............... 378/101, 102, 105, 109, 378/110; 363/59, 60, 61, 78, 100

[56] References Cited

U.S. PATENT DOCUMENTS

| 4,238,683 | 12/1980 | Baumann | 378/112 X |
|---|---|---|---|
| 4,517,472 | 5/1985 | Ruitberg et al. | 378/112 X |
| 4,553,255 | 11/1985 | Kanerva | 398/112 X |
| 4,720,844 | 1/1988 | Bougie | 363/61 X |

Primary Examiner—Eugene R. LaRoche
Assistant Examiner—David Mis
Attorney, Agent, or Firm—Robert J. Koch

[57] ABSTRACT

In a circuit arrangement for producing high voltages by means of a voltage multiplier with rectifiers and capacitors and fed from an alternating current source in which circuit arrangement, a low amplitude voltage lying at the high voltage level is produced by the ripple voltage across one or more of the component parts of the voltage multiplier, the average potential of which component part (s) does not differ substantially from the high voltage. In the case of an X-ray tube high voltage supply the total filament circuit may be approximately on the high cathode voltage and no severe requirements for insulation need to be fulfilled. The ripple voltage may be used to produce other small amplitude voltages lying at a high voltage level.

8 Claims, 2 Drawing Sheets

CIRCUIT ARRANGEMENT FOR PRODUCING HIGH VOLTAGES

BACKGROUND OF THE INVENTION

1. Field of the Invention

This invention relates to a circuit arrangement for producing high voltages by means of a voltage multiplier, e.g. of the Cockcroft-Walton type, that is fed from an alternating current source.

2. Description of the Related Technology

It is known per se to provide high-voltages e.g. for discharge tubes, including X-ray tubes, by means of voltage multipliers of the kind concerned.

In the case of X-ray tubes it is generally desired to earth the anode because this makes it easier to obtain the necessary dispersion of heat from the anode. In order to avoid extremely high potentials in relation to earth, it is a frequently chosen solution, however, to supply the anode and cathode of the X-ray tube from high-voltage sources of opposite polarities each at half of the full anode-cathode voltage of the tube.

In either case, the filament of the tube will attain a high voltage relative to earth and due to the fact that the magnitude of the filament current determining the intensity of the X-radiation shall, moreover, generally be adjustable, certain difficulties arise, in particular as regards fulfilment of the demands for insulation, whereby the means for supplying and controlling the filament current become excessively voluminous and heavy, meaning a considerable increase of the total volume and weight of the X-ray tube. This is particularly inadvantageous in case of mobile X-ray devices for radiological tests of materials.

This applies also to other parts of the tube, e.g. a bias grid, the voltage of which deviates by only a small amount from the cathode voltage of the tube.

Similar problems occur also in other devices than X-ray tubes, which are supplied from a circuit arrangement of the type in question, and where it is desirable to produce small amplitude voltages lying at the voltage level of the high voltage.

SUMMARY OF THE INVENTION

It is an object of the invention to remedy this disadvantage.

This is obtained according to the invention in that a voltage having a small amplitude with respect to the high voltage is produced by means of the ripple voltage across at least one of the component parts of the voltage multiplier, the average potential of component part (S) does not differ substantially from the high voltage, said small amplitude voltage being supplied to a utilizing circuit. Even though the high voltage produced by the voltage multiplier is principally a D.C. there is, nevertheless, a ripple voltage across the components of the multiplier having a basic frequency corresponding to the frequency of the A.C.-source, and this ripple voltage may be collected, e.g. by a transformer, and supplied to the utilizing circuit, e.g. the filament of an X-ray tube. The entire filament circuit may in this case lie approximately on the high cathode voltage and, therefore, severe demands for insulation do not need to be fulfilled, e.g. between the primary winding and secondary winding of an inserted transformer.

The easiest demands for insulation occur if the components of the voltage multiplier, across which the ripple voltage is collected, lie on a high potential level close to the high voltage. This may for instance be the rectifier of the multiplier which attains the highest potential. Economical advantages may, however, also be obtained if the potentials of the components concerned differ not quite immaterially from the high voltage, for example by one third of or perhaps even by half the high voltage relative to earth.

According to the invention the utilizing circuit may include a frequency depending impedance and the frequency of the A.C.-current source may be variable. In this case the current in the utilizing circuit may be controlled by variation of the voltage source frequency. The frequency depending impedance may be constituted by a resonant circuit. If the resonant frequency is close to the frequency variation area of the A.C.-voltage source, a large variation of the current is obtained for a small variation of the frequency.

The current may also be controlled by optical transmission to the utilizing circuit.

If, in the case of an X-ray tube, there is no need for varying the filament current or the emission current, the utilizing circuit may include means for keeping constant the filament current or the emission current of the X-ray tube.

The invention will now be explained in more detail with reference to the drawing illustrating an example of a circuit arrangement according to the invention for supplying and adjusting the filament current of an X-ray tube.

DETAILED DESCRIPTION OF THE PREFERRED EMBODIMENT

Figure 1:
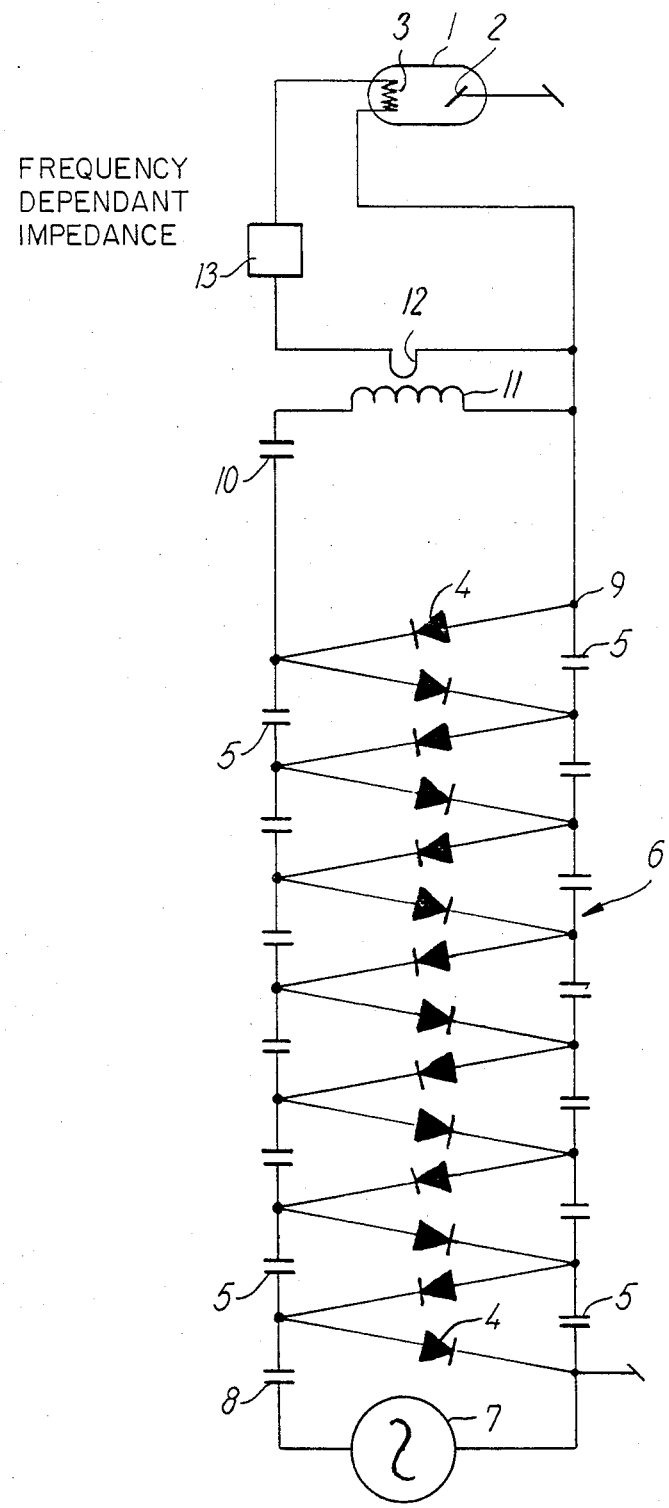
FIG. 1 shows an embodiment of the circuit arrangement according to the invention.

In the drawing 1 designates an X-ray tube having an anode 2 and a cathode 3 in the form of a filament. The high-voltage of the X-ray tube is provided by means of a voltage multiplier 6 of the Cockcroft-Walton type and composed of rectifiers 4 and capacitors 5. The voltage multiplier is fed from an A.C.-voltage source 7 via a capacitor 8.

A high negative voltage which is approximately a multiple of the peak voltage of the voltage source 7 and which is supplied to the filament 3 of the X-ray tube, the anode 2 of which is earthed, occurs at point 9 of the voltage multiplier.

By means of the ripple voltage occurring across the rectifier of the voltage multiplier having the highest potential relative to earth a small voltage is produced and supplied to a utilizing circuit, in the illustrated example to the filament circuit of the X-ray tube. Said ripple voltage is supplied via a condensator 10 to a primary winding 11 of a transformer, the secondary winding 12 of which forms part of the filament circuit of the X-ray tube, said circuit including besides the secondary winding 12 and the filament 3 a frequency dependent impedance 13. By varying the frequency of the A.C.-voltage source 7 the value of the impedance 13 changes and it is possible in this manner to control the filament current of the X-ray tube.

The variable impedance 13 may for instance be constituted by a resonant circuit which may either be a series resonant circuit or a parallel resonant circuit. If the frequency of the A.C.-voltage source is close to the resonant frequency a large variation of the impedance may be obtained and thereby of the filament current for a small variation of the frequency of the A.C.-voltage source.

The method of controlling the filament current just described requires no connections between the filament circuit lying on a high tension level and earthed adjusting members.

A second method of avoiding such conducting connections is the use of optical signal transmission between earthed adjusting members and an adjustable impedance forming part of the filament circuit.

However, it is also possible to effect a direct adjustment of the value of the impedance by means of insulating mechanical connectors.

Figure 2:
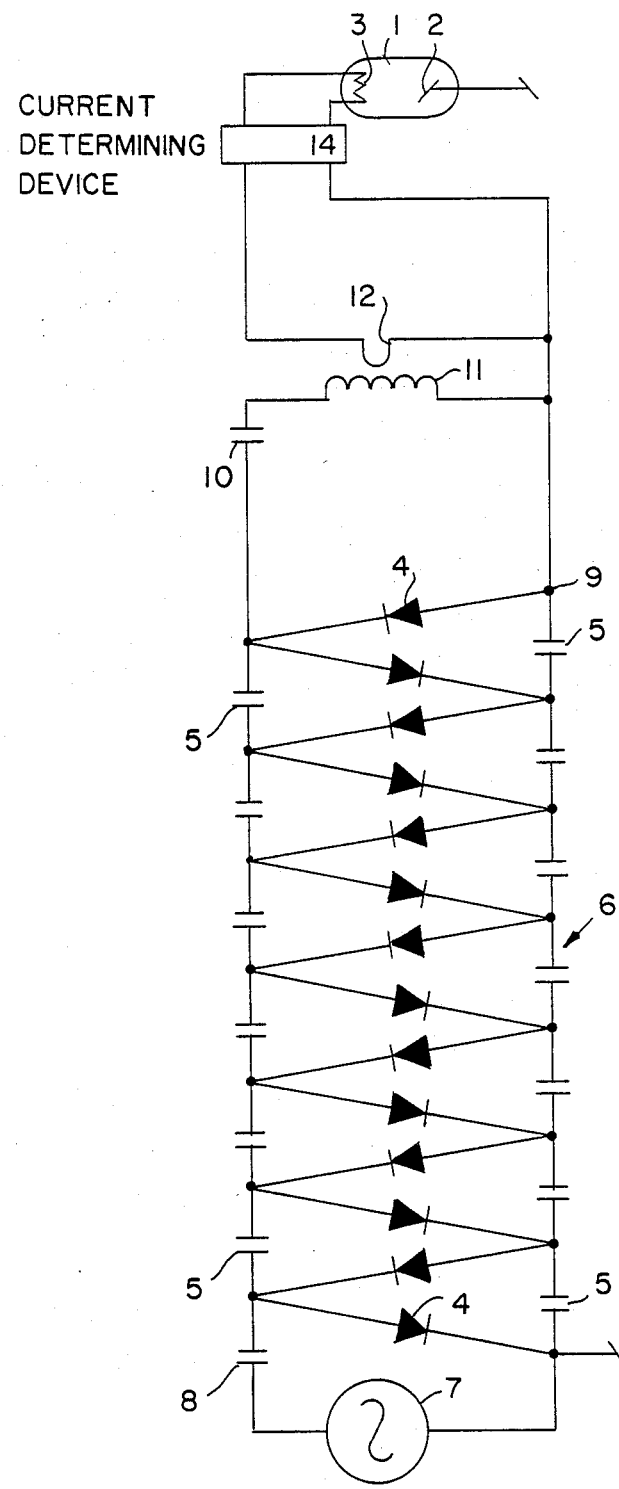
FIG. 2 shows an alternative embodiment.

If no variation of the filament current or of the emission current is required, a current determining device 14 (FIG. 2) comprising means for keeping the filament current or the emission current constant may be inserted into the filament circuit.

In the illustrated embodiment the anode of the X-ray tube is earthed, while the cathode 3 has a high negative voltage. The invention may, however, also be practised in case of using a bipolar high-voltage supply, in which the filament and the anode have opposite polarities relative to earth. The high voltage may in this case be provided by means of two more or less combined voltage multipliers generating oppositely polarized voltages.

The voltage multiplier does not need to be of the Cockcroft-Walton type, provided it includes a component having a comparatively high voltage, across which a ripple voltage occurs.

The ripple voltage does not need to be collected across the component of the voltage multiplier lying on the highest voltage relative to earth, as illustrated in the drawing, but may be collected across another component having a comparatively high voltage or across a combination of several components.

Instead of being used to produce the filament current of the X-ray tube, as illustrated, the ripple voltage may be used for other purposes. It may e.g. be supplied to a circuit arrangement for producing a voltage for a bias grid controlling the emission current of the X-ray tube.

The invention is not limited to X-ray tubes. The circuit arrangement according to the invention is applicable in any case, where a high voltage is produced by means of a voltage multiplier and it is desirable to produce a low amplitude voltage lying at the high potential level of the high voltage with respect to earth.

The invention is not restricted to the embodiments illustrated in the drawing and explained above, but it may be modified in various ways obvious to an expert within the scope of the following patent claims.

We claim:

1. A circuit arrangement comprising:
   a voltage multiplier;
   an alternating current source feeding said voltage multiplier; and
   means for supplying a small amplitude voltage with respect to the voltage multiplier high voltage, obtained from a ripple voltage across a component part of said voltage multiplier with an average potential not differing substantially from the high voltage to a utilizing circuit connected to said voltage multiplier.

2. A circuit arrangement as in claim 1 wherein said means for supplying further comprises a frequency depending impedance and wherein said alternating current source is frequency variable.

3. A circuit arrangement as in claim 2, wherein said frequency depending impedance is a resonant circuit.

4. A circuit arrangement as in claim 1, wherein said means for supplying further comprises means for optically transmitting a current control signal to said utilizing circuit connected to said voltage multiplier component part.

5. A circuit arrangement as in claim 1, wherein said utilizing circuit is an X-ray tube.

6. A circuit arrangement as in claim 5, wherein said utilizing circuit is the filament circuit of the X-ray tube.

7. A circuit arrangement as in claim 5, wherein said utilizing circuit comprises means for keeping constant a filament current or emission current of the X-ray tube.

8. A circuit arrangement as in claim 1, wherein said utilizing circuit is the circuit of a bias grid of an X-ray tube.

* * * * *